(12) United States Patent  
Masutani

(10) Patent No.: US 8,282,162 B2  
(45) Date of Patent: Oct. 9, 2012

(54) HEIGHT LOCK DEVICE FOR VEHICLE SEAT

(75) Inventor: Eiji Masutani, Shioya-gun (JP)

(73) Assignee: TS Tech Co., Ltd., Saitama-Ken (JP)

(*) Notice: Subject to any disclaimer, the term of this patent is extended or adjusted under 35 U.S.C. 154(b) by 626 days.

(21) Appl. No.: 11/917,079

(22) PCT Filed: Jun. 9, 2006

(86) PCT No.: PCT/JP2006/311660

§ 371 (c)(1),
(2), (4) Date: May 26, 2009

(87) PCT Pub. No.: WO2006/132377

PCT Pub. Date: Dec. 14, 2006

(65) Prior Publication Data

US 2009/0284053 A1    Nov. 19, 2009

(30) Foreign Application Priority Data

Jun. 9, 2005 (JP) .................................. 2005-169386

(51) Int. Cl.
*B60N 2/42* (2006.01)
(52) U.S. Cl. ................................ 297/216.1; 297/344.15
(58) Field of Classification Search ............... 297/216.1, 297/216.12, 344.12, 344.14, 344.15
See application file for complete search history.

(56) References Cited

U.S. PATENT DOCUMENTS

| | | | | |
|---|---|---|---|---|
| 4,790,597 A | * | 12/1988 | Bauer et al. | 297/468 |
| 6,478,378 B2 | * | 11/2002 | Muhlberger et al. | 297/344.12 |
| 6,505,888 B1 | * | 1/2003 | Teufel et al. | 297/344.15 |
| 6,533,351 B2 | * | 3/2003 | Deptolla | 297/216.2 |
| 6,733,075 B2 | * | 5/2004 | Schumann et al. | 297/344.12 |
| 7,036,878 B2 | * | 5/2006 | Masutani | 297/216.1 |

* cited by examiner

*Primary Examiner* — Sarah B McPartlin

(74) *Attorney, Agent, or Firm* — Browdy and Neimark, PLLC

(57) ABSTRACT

A vehicle seat is configured to be adjustable in height having a height adjusting mechanism composed of a link mechanism disposed between a lower rail provided at a vehicle body side and the vehicle seat. The vehicle seat comprises a guide plate provided on the vehicle seat, a gear plate attached to the lower rail and movably provided on the guide plate in a straight direction, a pair of lock arms provided on the guide plate and engageable with a pair of gear portions of the gear plate when an emergency load is applied to a seat belt of a vehicle seat occupant. The pair of gear portions is formed by mutually deviating by half pitch P each between an engagement plane of one gear portion and an engagement plane of the other gear portion.

4 Claims, 9 Drawing Sheets

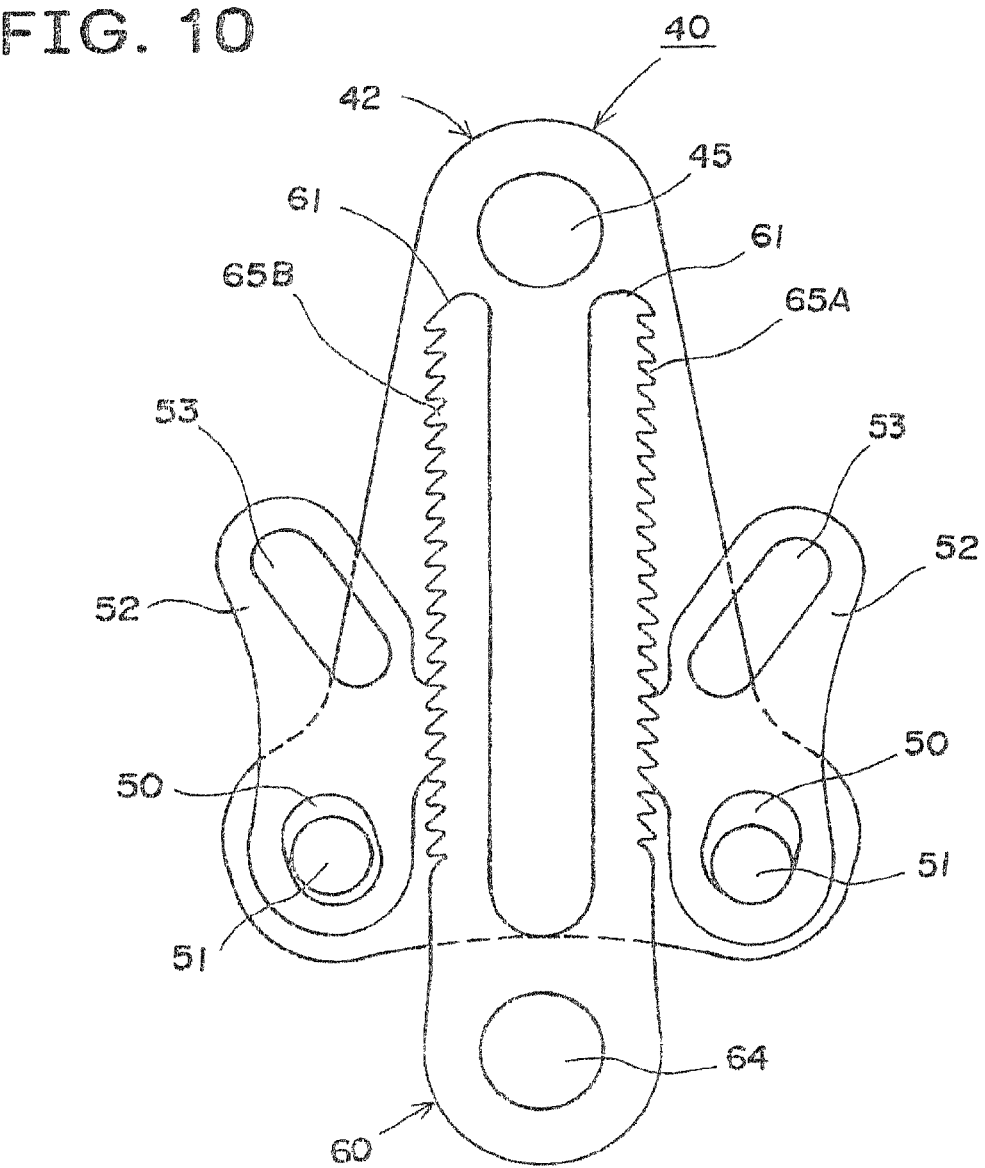

HEIGHT LOCK DEVICE FOR VEHICLE SEAT

TECHNICAL FIELD

The present invention relates to a height lock device for a vehicle seat.

BACKGROUND ART

A conventional vehicle seat is provided with a seat belt mechanism for protecting a vehicle seat occupant when a strong external force is applied to the occupant in forward direction due to collision or other trouble of the vehicle. The seat belt mechanism applies a strong load to the vehicle seat in upward direction when supporting the vehicle seat occupant by resisting a strong external force.

Hence, the vehicle seat is provided with a height lock mechanism for preventing the vehicle seat from moving upward by the upward load applied by the seat belt mechanism.

Patent document 1: JP Appln. Laid-Open No. 2002-59770

DISCLOSURE OF THE INVENTION

The prior art height lock mechanism prevents the vehicle seat from moving upward by engaging the gear with a sector gear portion of a lock arm. However, the relative position of the gear and lock arm varies with the change of height position of the vehicle seat, and thus the lock performance of the height lock mechanism varies with the change of height position of the vehicle seat.

It is hence an object of the invention to provide a height lock device for vehicle seat capable of keeping the lock performance constant and engaging the gear and lock arm smoothly even if the height position of the vehicle seat is adjusted.

BRIEF DESCRIPTION OF THE DRAWINGS

FIG. 10 is a front view of the height lock mechanism in locked state.

BEST MODE FOR CARRYING OUT THE INVENTION

Figure 1:
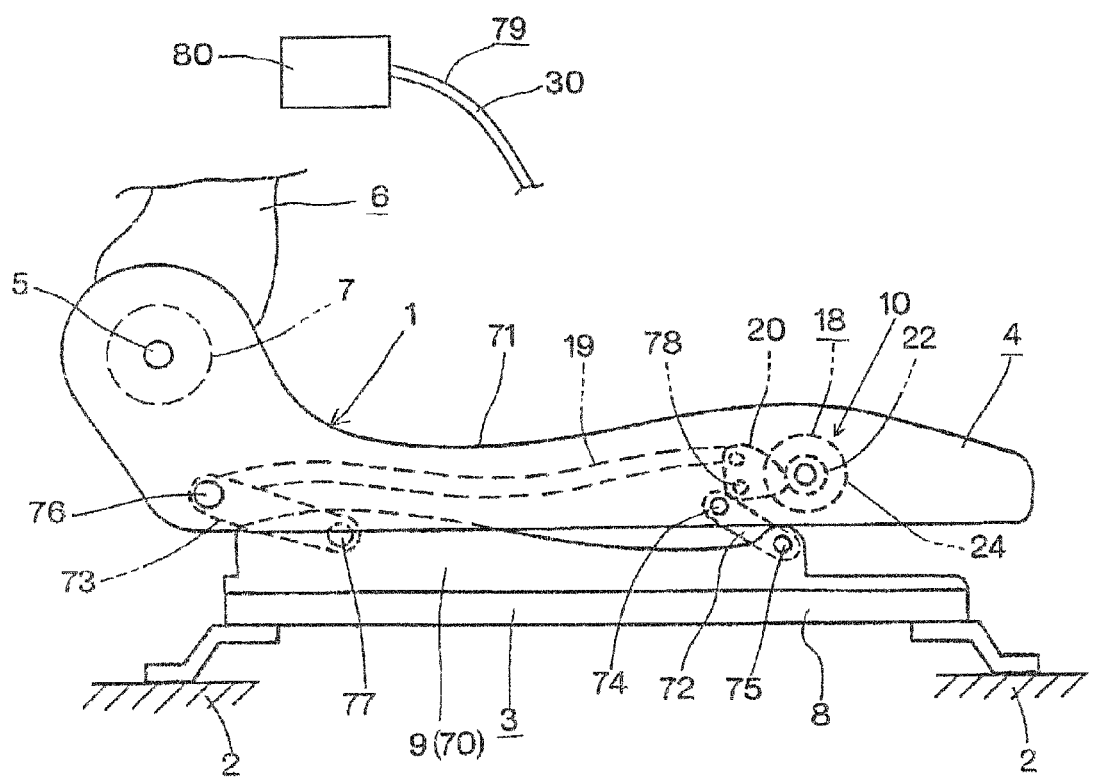
FIG. 1 is a schematic view of a lateral side of a vehicle seat.

A vehicle seat 1 according to an embodiment of the invention comprises a seat bottom 4 slidably attached to a vehicle body (floor panel) 2 by way of a slide mechanism 3, and a seat back 6 attached to the seat bottom 4 rotatably about a shaft 5. FIG. 1 does not show an elastic member such as urethane foam to be attached to the vehicle seat 1. The seat back 6 is held at an arbitrary angle with respect to the seat bottom 4 by means of a reclining mechanism 7.

The slide mechanism 3 has a lower rail 8 fixed to the vehicle body 2, and an upper rail 9 slidably engaged with the lower rail 8. An integral longitudinal bracket 70 of the upper rail 9 is coupled to a seat bottom frame 71 by way of a height adjusting mechanism 10.

The height adjusting mechanism 10 has a front side rotary arm 72 and a rear side rotary arm 73. The upper part of the front side arm 72 is pivoted on the seat bottom frame 71 by means of a front side upper shaft 74, and the lower part of the front side arm 72 is pivoted on the longitudinal bracket 70 of the upper rail 9 by means of a front side lower shaft 75. The upper part of the rear side arm 73 is journaled on the bottom frame 71 by means of a rear side upper shaft 76, and the lower part of the rear side arm 73 is pivoted on the longitudinal bracket 70 by means of a rear side lower shaft 77.

An operation unit 18 of the height adjusting mechanism 10 is disposed at a desired position of the vehicle seat 1. The operation unit 18 has an operation dial 24, a gear 22 rotated by the operation dial 24, and a sector gear 20 meshed with the gear 22 to rotate about a shaft 78. The sector gear 20 is coupled to the upper part of the rear side rotary arm 73 by way of coupling means 19 such as rod or wire. When the operation dial 24 is rotated by the vehicle seat occupant, the sector gear 20 rotates about the shaft 78, the inclination angle of the rear side rotary arm 73 is changed, and the seat bottom 4 is moved vertically. This configuration of the height adjusting mechanism 10 is only an example, and the invention may be applied to various conventional height adjusting mechanisms.

Figure 2:
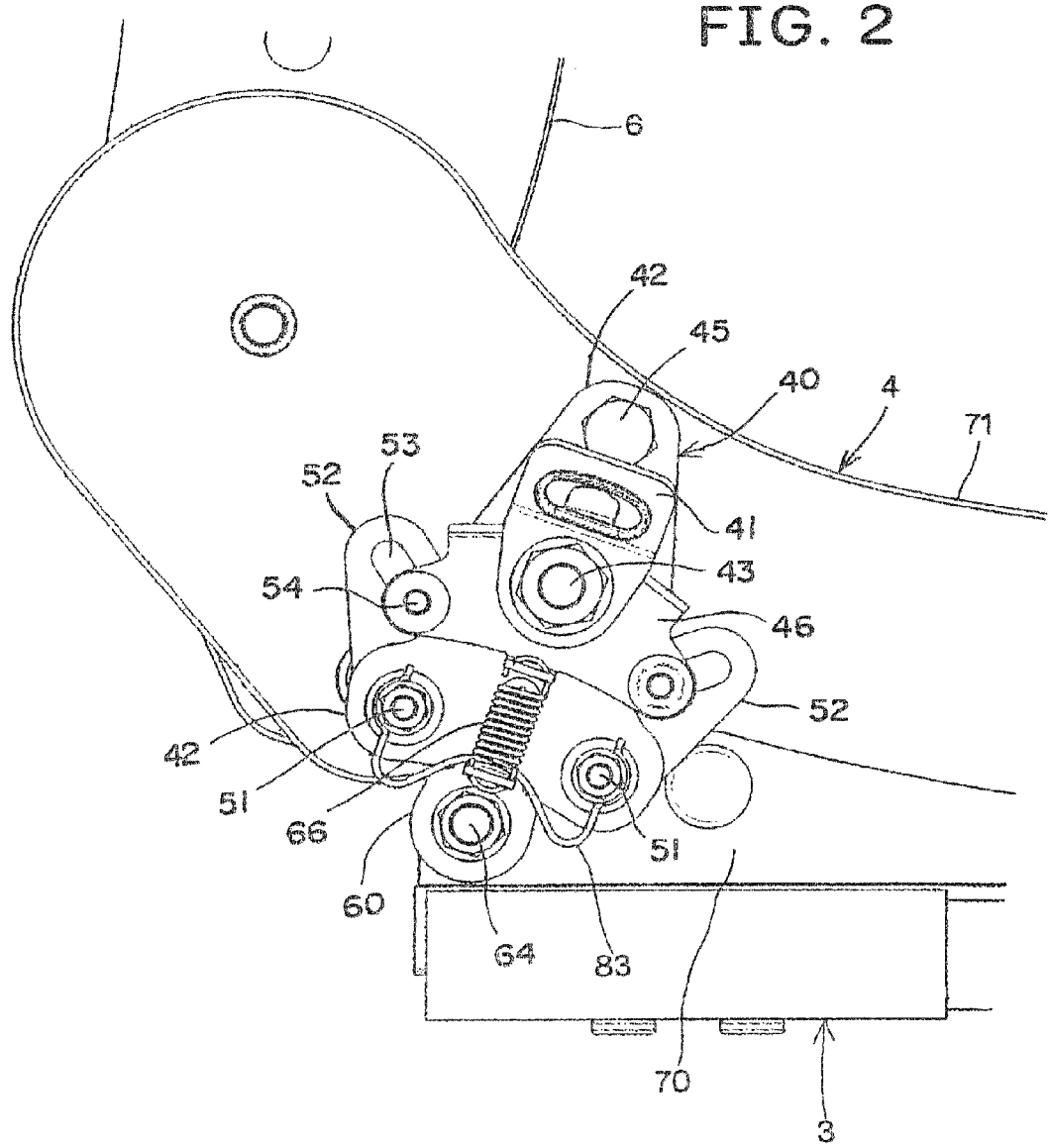
FIG. 2 is a front view of a height lock mechanism of the invention.

The vehicle seat 1 has a seat belt mechanism 79. The seat belt mechanism 79 has a belt retractor 80 and a seat belt 30. The retractor 80 is fixed to the vehicle body 2 or vehicle seat 1. The retractor 80 regulates drawing of the seat belt 30 when a strong forward load is applied to the seat belt 30 by collision of the car or the like. The leading end of the seat belt 30 is coupled to a belt anchor 41 (FIG. 2).

Figure 3:
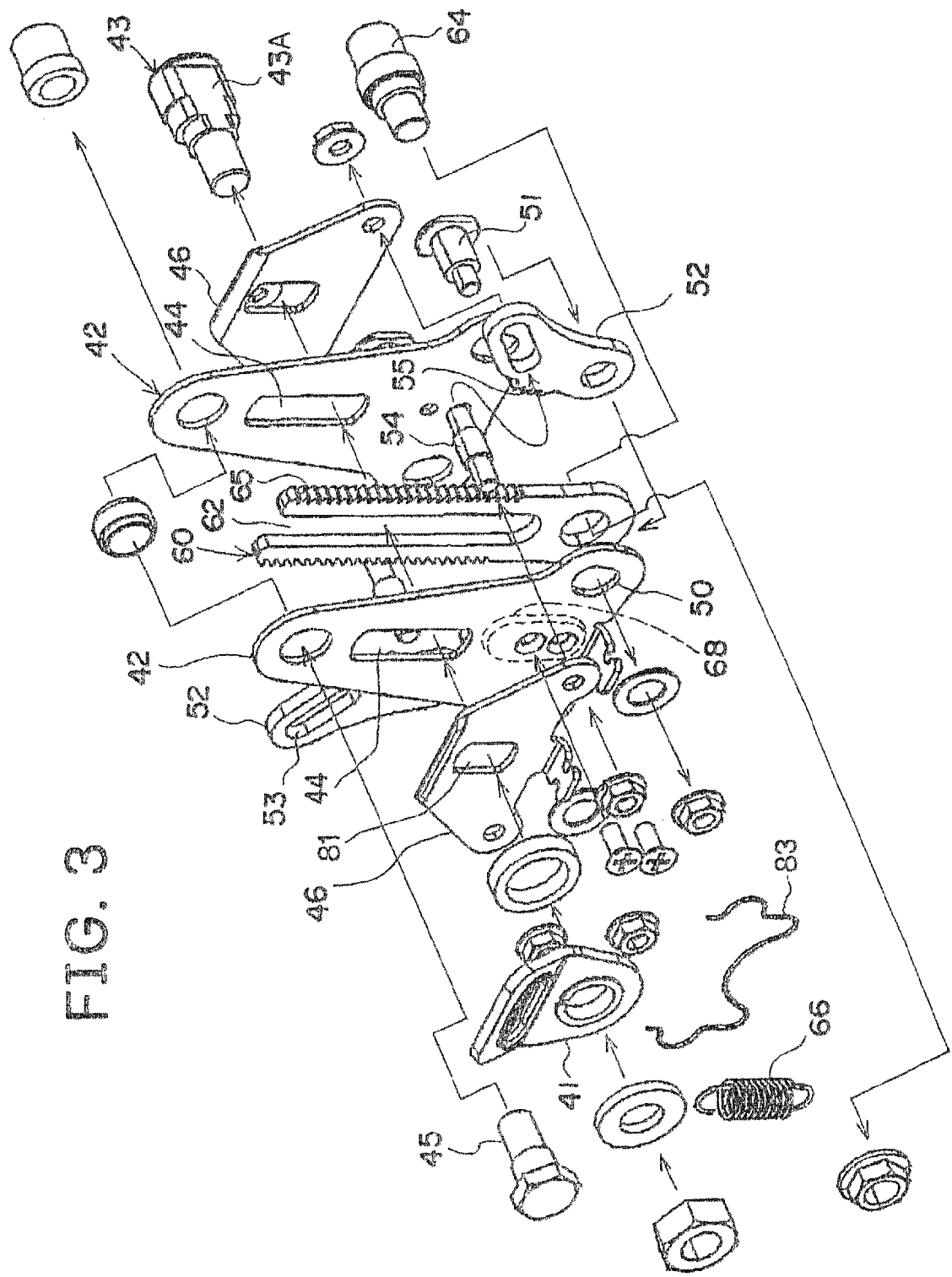
FIG. 3 is an exploded view of the height lock mechanism.
Figure 4:
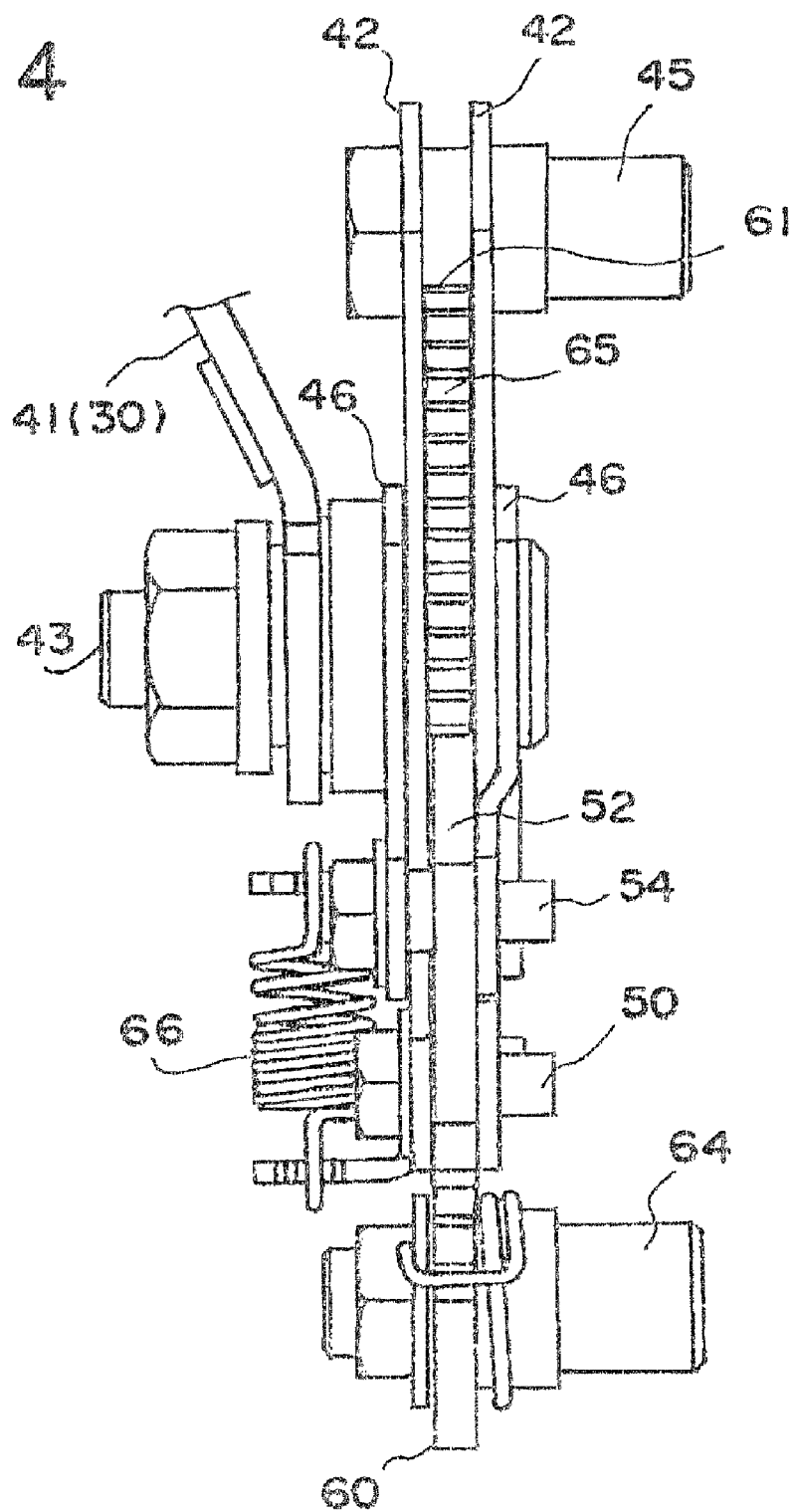
FIG. 4 is a side view of the height lock mechanism.

Between the upper rail 9 and seat bottom frame 71, a height lock mechanism 40 is provided for preventing the seat bottom frame 71 from moving above the upper rail 9 when a strong forward load is applied to the seat belt 30. The height lock mechanism 40 has, as clearly shown in FIG. 3, a pair of guide plates 42, and a gear plate 60 provided between the guide plates 42. The guide plates 42 are substantially triangular in shape, and are fixed to the seat bottom frame 71 by means of an upper mounting shaft 45. The interval of the guide plates 42, 42 is kept constant by a stepped shaft 43 inserted into longitudinal slots 44, 44 of the guide plates 42, 42. The guide plates 42, 42 are movable in vertical direction relatively to the stepped shaft 43.

The gear plate 60 has a vertically extended U-shape, and is fixed to the longitudinal bracket 70 (upper rail 9) by means of a lower mounting shaft 64. A longitudinal groove 62 of the gear plate 60 is slidably supported by the stepped shaft 43.

A pair of shaft holes 50, 50 are provided at both sides of the lower part of each guide plate 42, lock shafts 51, 51 are inserted in the shaft holes 50, 50, and lock arms 52, 52 are rotatably supported on the lock shafts 51, 51. When the lock arms 52, 52 rotate inside, they are engaged and held with gear portions 65, 65 of the gear plate 60, thereby regulating the relative vertical motion of the gear plate 60 (vehicle body 2) and the guide plate 42 (vehicle seat 1).

The height lock mechanism 40 has a pair of moving plates 46, 46 positioned outside of the guide plates 42, 42. Each moving plate 46 has an engaging hole 81 to be engaged with the stepped shaft 43, and the belt anchor 41 is fixed to the leading end of the stepped shaft 43. When the seat belt 30 is pulled by external force, the belt anchor 41 moves upward, and the stepped shaft 43 also moves up in the longitudinal groove 62 of the gear plate 60. The moving plates 46, 46 fixed to the stepped shaft 43 are also moved upward at the same time.

Guide bars 54, 54 are provided between the moving plates 46, 46. The guide bars 54, 54 are slidably engaged with guide slots 53, 53 formed at the leading end side of the lock arms 52, 52. The moving plate 46 is provided with an upper leg of a spring 66, and a lower leg of the spring 66 is engaged with a bent part 82 of the guide plate 42, thereby biasing the moving plate 46 downward by the elastic force of the spring 66.

Figure 5:
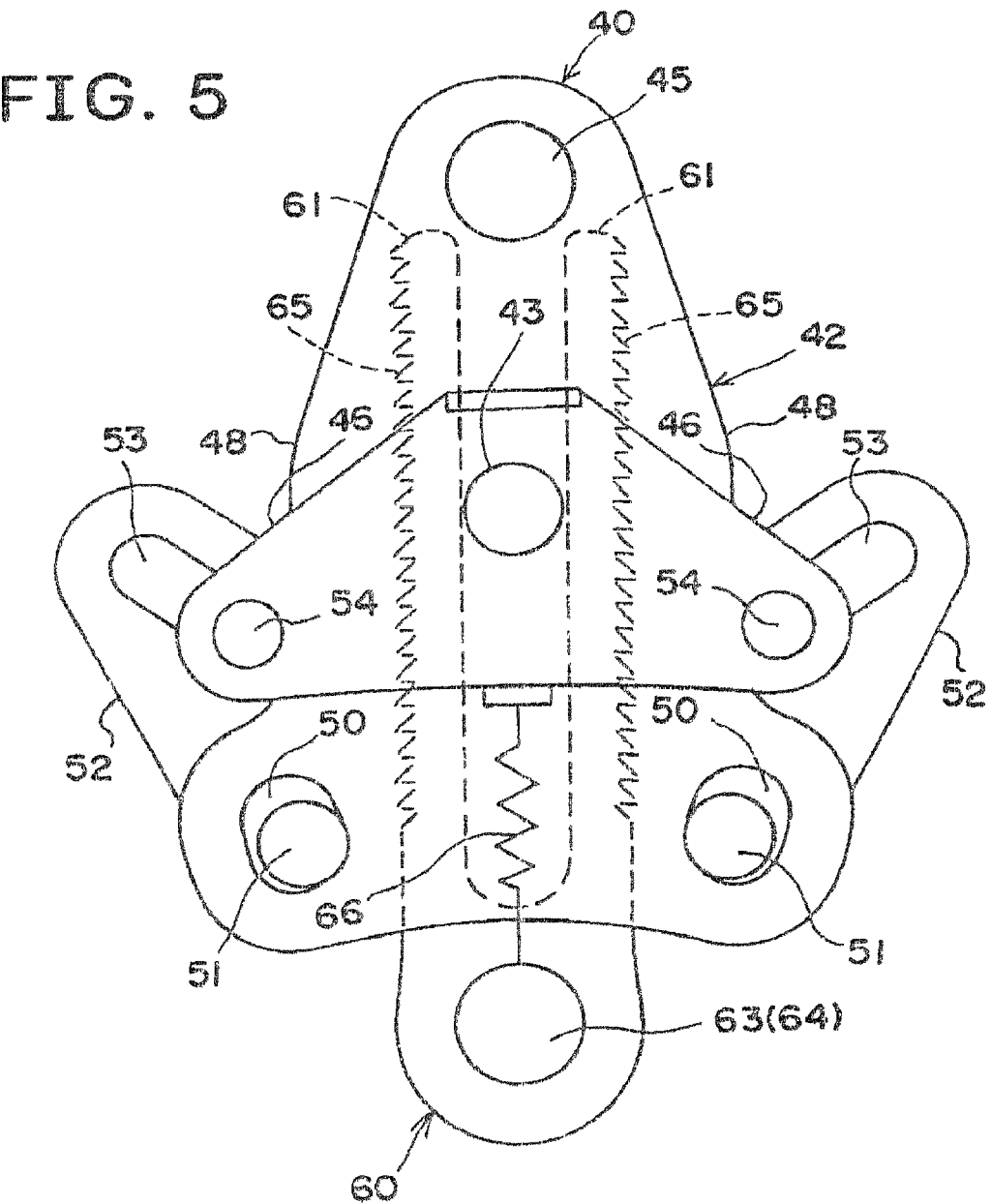
FIG. 5 is a front view of the height lock mechanism.

While a normal external force is acting on the seat belt 30 (excessive external force by collision of the car is not acting on the seat belt 30), the belt anchor 41 is held at a lower position by the elastic force of the spring 66, and the stepped shaft 43 is positioned in a lower part in the longitudinal slot 44 of the guide plate 42. In this normal state, as shown in FIG. 5, the guide bars 54, 54 are positioned at the base of the guide slots 53, 53 of the lock arms 52, 52, the lock arms 52, 52 depart from the gear portions 65, 65 of the gear plate 60, and the height lock mechanism 40 is in unlocked state. Accordingly, by the height adjusting mechanism 10, the spacing of the vehicle body 2 and the vehicle seat 1 can be adjusted freely.

Figure 9:
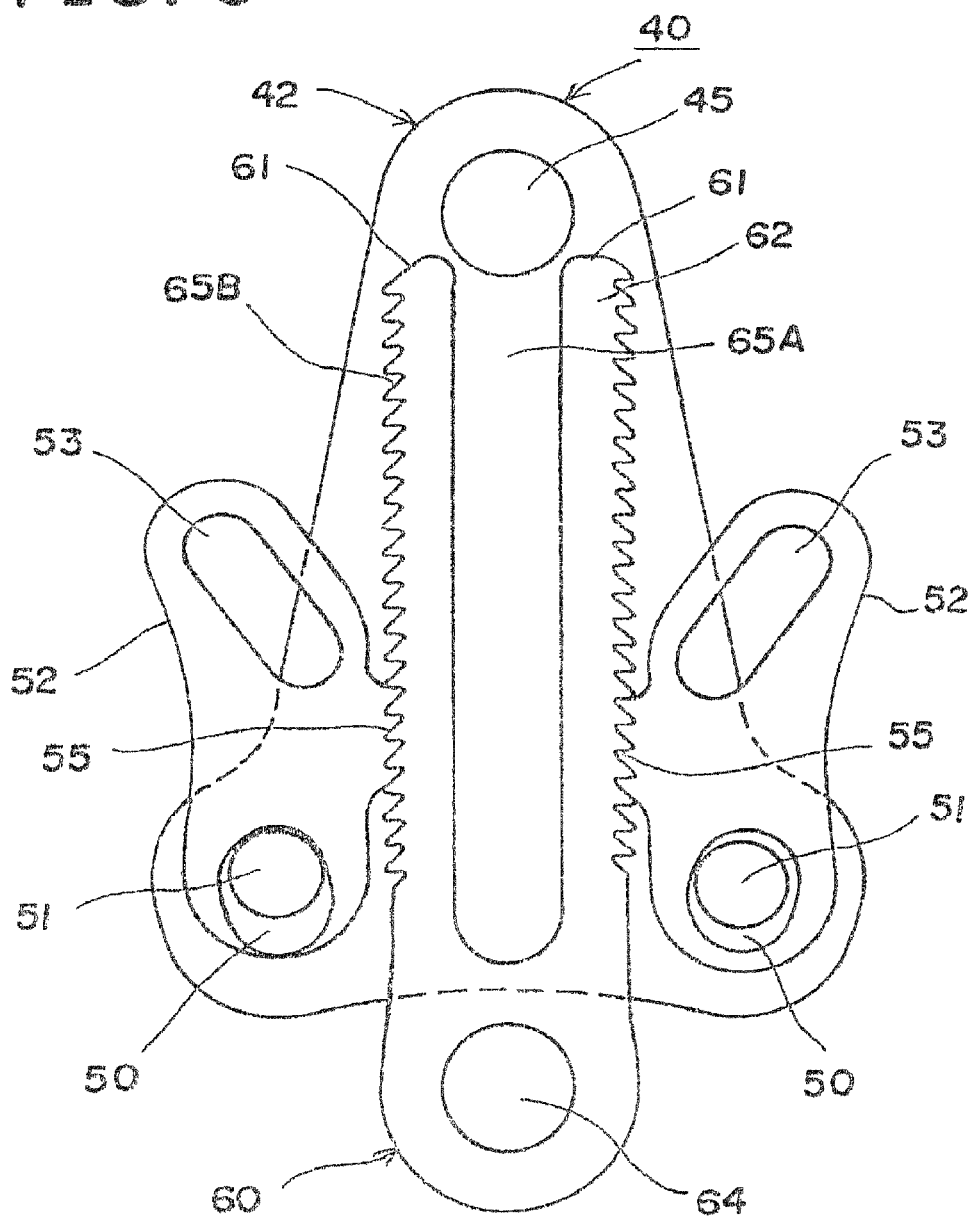
FIG. 9 is a front view of the height lock mechanism immediately before the end of transfer from unlocked state to locked state.

By contrast, when an excessive external force acts on the seat belt 30, the belt anchor 41 moves up, and the stepped shaft 43 moves to the upper part in the longitudinal slot 44 of the guide plate 42. As a result, the guide bars 54, 54 move in the guide slots 53, 53 of the lock arms 52, 52 toward the leading end portion, the lock arms 52, 52 rotate to inside and are engaged with the gear portion 65 of the gear plate 60 as shown in FIGS. 9 and 10, and the height lock mechanism 40 comes to locked state. As a result, the spacing of the vehicle body 2 and the vehicle seat 1 is fixed.

Figure 6:
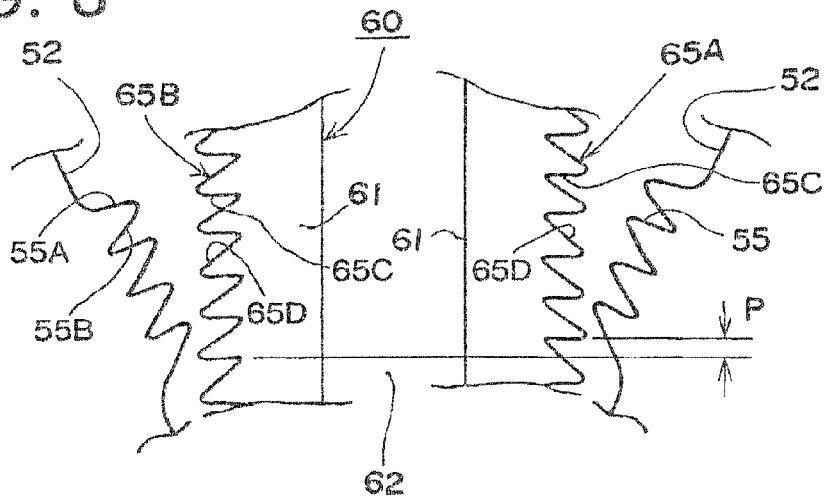
FIG. 6 is a magnified front view of an engagement gear of a gear portion of a gear plate and a lock arm of the height lock mechanism.
Figure 7:
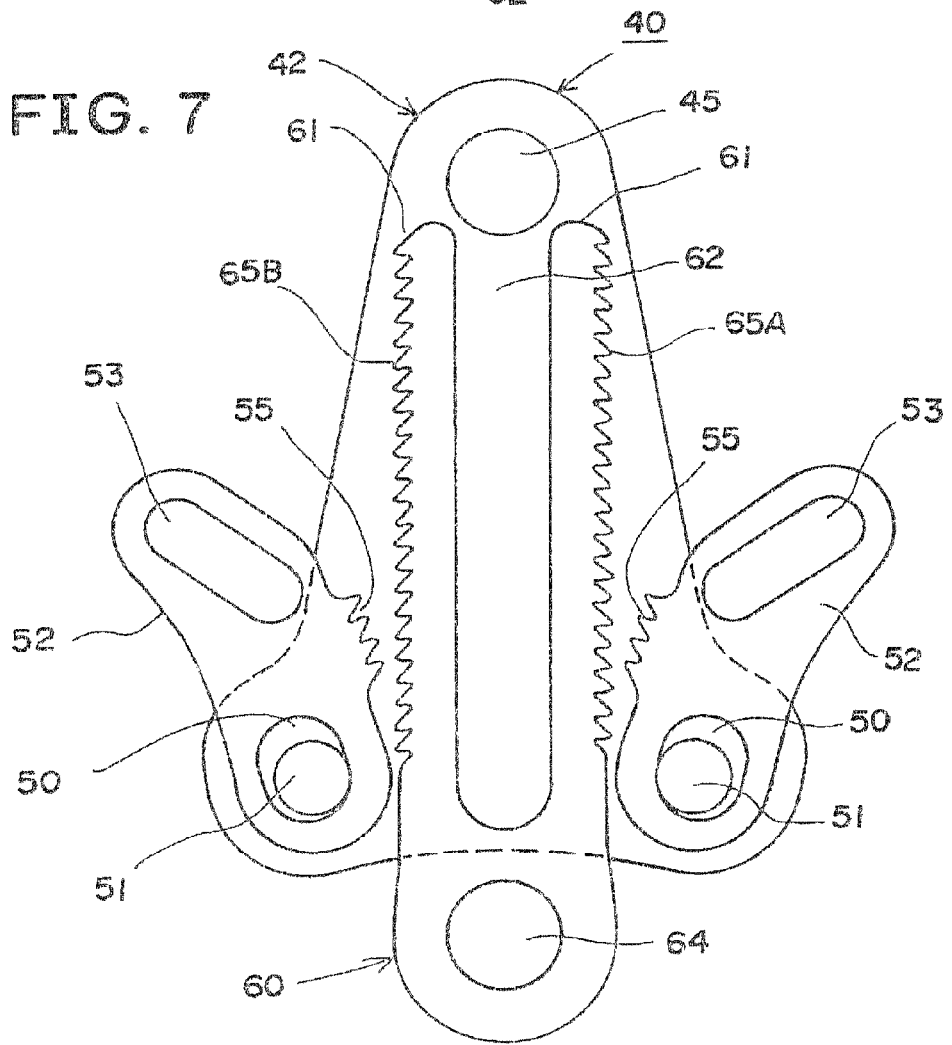
FIG. 7 is a front view of the height lock mechanism in unlocked state.

As shown in FIG. 6, the gear plate 60 has a pair of longitudinal linear gear portions 65A, 65B; each gear portion has a horizontal engaging plane 65C and an inclined guide plane 65D; and an engagement gear 55 of the lock arm 52 has a horizontal engaging plane 55A to be engaged with the horizontal engaging plane 65C, and an inclined guide plane 55B to be engaged with the inclined guide plane 65D.

As mentioned above, when an excessive external force acts on the seat belt 30, the lock arms 52, 52 rotate toward the inside, and are engaged with the gear portions 65A, 65B of the gear plate 60. However, at the moment of engagement of the engagement gears 55, 55 of the lock arms 52, 52 with the gear portions 65A, 65B of the gear plate 60, the leading ends of the engagement gears 55, 55 and the leading ends of the gear portions 65A, 65B may collide against each other face to face, the engagement gears 55, 55 and the gear portions 65A, 65B may be stuck, and the height lock mechanism 40 may not be smoothly locked in a very rare case. In the invention, the shaft hole 50 of the lock arm 52 is formed in a larger diameter than the lock shaft 51, a play is provided between the shaft hole 50 and the lock shaft 51, and a spring 83 for biasing the lock shafts 51, 51 to be closer to each other is provided between the lock shafts 51, 51. In this configuration, if the leading ends of the engagement gears 55, 55, and the leading ends of the gear portions 65A, 65B may collide against each other face to face, the lock shafts 51, 51 move in the wide shaft holes 50, 50 by resisting the elastic force of the spring 83, and the engagement gears 55, 55 and the gear portions 65A, 65B are disengaged, thereby preventing the engagement gears 55, 55 and the gear portions 65A, 65B from being stuck, so that the engagement gears 55, 55 and the gear portions 65A, 65B may be smoothly engaged with each other.

As is clear from FIG. 6, the gear portions 65A, 65B formed in the U-shaped leg 61 of the gear plate 60 are disposed as being deviated by the portion of half pitch P each of the gear portion.

A load is applied to the belt anchor 41, the stepped shaft 43 moves up the moving plate 46, and the front and rear guide bars 54 of the moving plate 46 act on the guide slots 53 of the pair of lock arms 52, thereby rotating the lock arms 52. At this time, if the timing of action of the front and rear guide bars 54 of the moving plate 46 is deviated and the engagement positions of the engagement gears 55 of the lock arms 52 to be engaged with the front and rear gear portions 65A, 65B are deviated to be locked in misalignment, such amount of misalignment is always one pitch or more. In the invention, phases of the engagement plane 65C of the gear portion 65A and the engagement plane 65C of the rear gear portion 65B are preliminarily deviated by half pitch P each. Hence, the front and rear lock arms 52 are always locked in misalignment, but the amount of misalignment may be considerably decreased.

Reference numeral 68 is a guide member fixed to the guide plate 42, and it is fitted to a guide groove 62 of the gear plate 60 and guides the vertical motion of the guide plate 42, so that the guide plate 42 moves linearly.

Operation of the Embodiment

While a normal external force is acting on the seat belt 30 (excessive external force by collision of the car is not acting on the seat belt 30), the belt anchor 41 is held at a lower position by the elastic force of the spring 66, and the stepped shaft 43 is positioned in a lower part in the longitudinal slot 44 of the guide plate 42. In this normal state, as shown in FIG. 5, the guide bars 54, 54 are positioned at the base of the guide slots 53, 53 of the lock arms 52, 52, the lock arms 52, 52 depart from the gear portions 65, 65 of the gear plate 60, and the height lock mechanism 40 is in unlocked state.

In this state, when adjusting the height of the vehicle seat 1, the operation dial 24 is turned to rotate the sector gear 20, and the rear side rotary arm 73 is rotated by way of the coupling means 19. As a result, the inclination angle of the rear side rotary arm 73 is changed, and the spacing of the seat bottom frame 71 and the bracket 70 (vehicle body 2) is adjusted, thereby changing the height position of the vehicle seat 1. At this time, the belt anchor 41 of the seat belt 30 moves vertically together with the guide plate 42 of the vehicle seat 1, and hence even, if the height of the vehicle seat 1 is changed, the seat belt 30 is free from tension or looseness.

If an excessive external force acts on the seat belt 30 due to collision of the car or the like, the belt anchor 41 moves up by resisting the elastic force of the spring 66, and the stepped shaft 43 moves to the upper part in the longitudinal slot 44 of the guide plate 42. Then, the guide bars 54, 54 move in the guide slots 53, 53 of the lock arms 52, 52 toward the leading end portion, the lock arms 52, 52 rotate to inside and are engaged with the gear portions 65, 65 of the gear plate 60, and the height lock mechanism 40 comes to locked state. As a result, the spacing of the vehicle body 2 and the vehicle seat 1 is fixed.

Thus, when an excessive external force acts on the seat belt 30, the lock arms 52, 52 rotate toward the inside, and are engaged with the gear portions 65, 65 of the gear plate 60. However, at the moment of engagement of the engagement gears 55, 55 of the lock arms 52, 52 with the gear portions 65, 65 of the gear plate 60, the leading ends of the engagement gears 55, 55 and the leading ends of the gear portions 65, 65 may collide against each other face to face, the engagement gears 55, 55 and the gear portions 65, 65 may be stuck, and the height lock mechanism 40 may not be smoothly locked in a very rare case. In the invention, the shaft holes 50, 50 of the lock arms 52, 52 are formed in a larger diameter than the lock shafts 51, 51, a play is provided between the shaft holes 50, 50 and the lock shafts 51, 51, and a spring 83 for biasing the lock shafts 51, 51 to be closer to each other is provided between the lock shafts 51, 51. In this configuration, if the leading ends of the engagement gears 55, 55, and the leading ends of the gear portions 65, 65 collide against each other face to face, the lock shafts 51, 51 move in the wide shaft holes 50, 50 by resisting the elastic force of the spring 83, and the engagement gears 55, 55 and the gear portions 65, 65 are disengaged, thereby preventing the engagement gears 55, 55 and the gear portions 65, 65 from being stuck, so that the engagement gears 55, 55 and the gear portions 65, 65 may be smoothly engaged with each other.

When the lock arms 52, 52 rotate to inside about the lock shafts 51, 51, the lower ends of the engagement gears 55, 55 of the lock arms 52, 52 first abut against the gear portions 65, 65 of the gear plate 60, and initial engagement of the lock arms 52, 52 and the gear plate 60 is completed. Also in this case, if there is no play between the shaft holes 50, 50 and the lock shafts 51, 51, the subsequent secondary engagement may not be smooth. However, since a play is provided between the shaft holes 50, 50 and the lock shafts 51, 51 in the invention, after successful completion of the initial engagement, the lock shafts 51, 51 move up in the wide shaft holes 50, 50 by resisting the elastic force of the spring 83, and the engagement gears 55, 55 of the lock arms 52, 52 are entirely engaged smoothly and securely with the gear portions 65, 65 of the gear plate 60.

When the height lock mechanism 40 comes to locked state, the vehicle seat 1 is supported on the vehicle body 2 by way of the height adjusting mechanism 10 and the height lock mechanism 40. In other words, excessive external force applied to the vehicle seat 1 due to collision of the car or the like is transmitted to the vehicle body 2 by way of both the height adjusting mechanism 10 and the height lock mechanism 40. Accordingly, the required strength of the height adjusting mechanism 10 or vehicle seat 1 may be lessened, and the entire weight of the vehicle seat 1 may be reduced.

In the height lock mechanism 40 of the invention, the gear plate 60 is pivoted on the vehicle body 2, the guide plate 42 is pivoted on the vehicle seat 1, and the gear plate 60 and guide plate 42 always move linearly and relatively even if the relative position of the vehicle body 2 and vehicle seat 1 is changed. The lock arms 52, 52 are pivoted on the guide plate 42. Therefore, the angle of rotating direction of the lock arms 52, 52 and length direction of the gear plate 60 is always kept constant, and the engagement performance of the lock arms 52, 52 and the gear plate 42 is always kept constant.

The gear plate 60 forms a guide groove 62 between a pair of U-shaped legs 61, and forms the gear portions 65A, 65B on the outer circumference of the legs 61. Therefore, the lock arms 52 are engaged with two positions of the gear portions 65A, 65B at front and rear sides, so that locking is very secure.

That is, the pair of lock arms 52 support and lock the gear plate 60 from both sides, and thus the reacting forces for mutually locking the pair of lock arms 52 are in mutually supporting relative positions, so that the locking is very strong.

The guide groove 62 of the gear plate 60 is straight, and may be installed regardless of motion of a link mechanism of the height adjusting mechanism 10, so that mounting restrictions are decreased, and the degree of freedom of design is enhanced.

In this case, the mounting shaft 64 of the gear plate 60 and the mounting shaft for moving side 45 of the guide plate 42 are disposed so that the mounting shaft for moving side 45 may be located at the front side and the mounting shaft 64 may be located at the rear side, and the height lock device 40 is installed so that the guide groove 62 of the gear plate 60 may be formed in an upward climbing slope. Therefore, the loading direction on the vehicle seat 1 and the length direction of the guide groove 62 of the gear plate 60 coincide with each other, and a uniform load is applied to the pair of legs 61 of the gear plate 60. This is therefore a rational configuration not decreasing the load enduring performance of the gear plate 60.

The insertion hole 44 of the guide plate 42 and the guide groove 62 of the gear plate 60 are fitted with a different diameter portion 43A at the stepped shaft 43, and the guide plate 42 is provided with the guide member 68 to be fitted with the guide groove 62. Therefore, the relative position of the guide plate 42 and gear plate 60 is held by the stepped shaft 43 and guide member 68, so that the load applied to the vehicle seat 1 is distributed uniformly in the pair of legs 61 of the gear plate 60, and the load enduring performance of the height lock device 40 may be enhanced. When adjusting the height of the vehicle seat 1, guiding may be smooth by supporting at two points by the stepped shaft 43 and guide member 68.

The relative position of the guide plate 42 and gear-plate 60 is held by the stepped shaft 43 and guide member 68, and loading on one of the pair of legs 61 of the gear plate 60 is prevented, so that the load enduring performance of the height lock device 40 may be enhanced.

The guide plates 42 are disposed as a mutually opposite pair so as to enclose the gear plate 60 and lock arm 52, and the guide plate 42 moves up and down smoothly according to the vertical motion of the vehicle seat.

The moving plate 46 is disposed at a position for holding the pair of guide plates 42, and when the stepped shaft 43 moves up and the moving plate 46 moves up due to load on the seat belt 30, the pair of moving plates 46 move up the both ends of the guide bar 54 to rotate the lock arm 52, thereby actuating the lock arm 52 securely.

The engagement gears 55 of the lock arms 32 and the gear portions 65A, 65B of the gear plate 60 have and form mutually opposite engagement planes 65C and inclined guide planes 65D, and hence the engagement gears 55 and gear portions 65A, 65B are mutually locked by the engagement planes 65C in the intersecting direction to the moving direction (load direction), and the load is supported firmly.

If the engagement gears 55 of the lock arms 52 are merely engaged with the gear portions 65A, 65B of the gear plate 60 by rotary motion about the lock shaft 51, they may be stuck due to deviation in position between the engagement gears 55 and the gear portions 65A, 65B. However, in the invention, the pair of insertion holes 50 of the guide plate 42 inserted in the lock shaft 51 of the lock arm 52 is provided with a play larger than the outside diameter of the lock shaft 51, and the lock shaft 51 at the base of the pair of lock arms 52 is provided with a spring 75 for biasing the pair of lock shafts 51 to be closer to each other. Therefore, initially the lock arm 52 rotates about the lock shaft 51 by the action of the guide bar 54 and guide slot 53 (FIG. 8).

Consequently, when the guide plane 67B of the engagement gear 55 abuts against the guide plane 67B of gear portions 657A, 65B, the lock shaft 51 starts to move in the insertion hole 50 by resisting the elastic force of the spring 75, and the lock arm 52 rotates about two points of fulcrum, the guide bar 54 and lock shaft 51, and hence meshing of the engagement gear 55 and gear portions 65A, 65B is promoted (FIG. 9).

Figure 8:
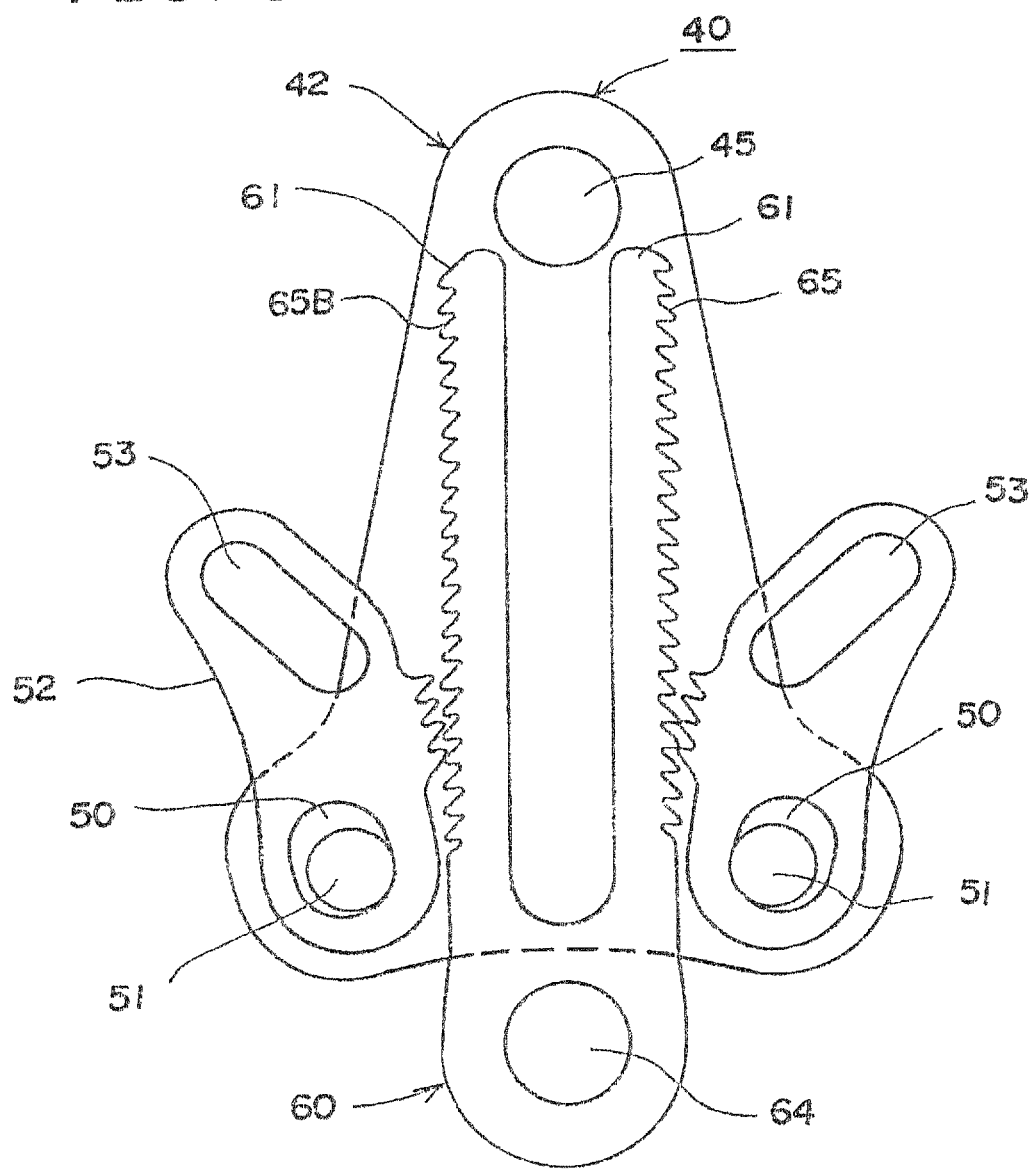
FIG. 8 is a front view of the height lock mechanism in an initial stage of transfer from unlocked state to locked state.

That is, as shown in FIGS. 8 and 9, the lock shaft 51 moves in the insertion hole 50, and the engagement gear 55 moves up and moves circularly about the lock shaft 51, and hence the engagement gear 55 moves toward the gear portions 65A, 65B, as if to move in parallel.

At the same time, the stepped shaft 43 attached with the seat belt 30 abuts against the upper edge of the insertion hole 44, the load of the seat belt 30 is applied to the mounting shaft for moving side 45 of the guide plate 42, the guide plate 42 moves up (FIG. 10), the lock shaft 51 of the lock arm 52 descends relatively to the insertion hole 50, and the engagement gear 55 and the engagement plane 65C of the gear portions 65A, 65B are meshed with each other without allowing play in vertical direction (FIG. 10).

Therefore, in a simple configuration having a play in the insertion hole 50 for mounting the lock shaft 51 of the lock arm 52, the engagement gear 55 and gear portions 65A, 65B can be prevented from being stuck, and as compared with a configuration of meshing the engagement grooves by a complicated link mechanism, a rational structure free from mechanical lock or other problems may be realized.

Thus, the guide bar 54 of the moving plate 46 for locking and moving the lock arm 52, and the guide slot 53 of each one of the pair of lock arms 52 are deviated in action timing, the engagement height position of the engagement gears 55 of the lock arms 52 is deviated, and they may be locked in misalignment. However, since the front and rear gear portions 65A, 65BA and 65BB of the gear plate 60 are formed by mutual phase difference of half pitch P between the engagement planes 65C of the front side gear portions 65A, 65BA and the engagement planes 65C of the rear side gear portions 65A, 65BB (FIGS. 6 to 10), the front and rear lock arms 52 are always locked in misalignment, but the degree of misalignment may be substantially decreased.

That is, "misaligned lock" deviated in engagement height position of the engagement gears 55 of the front and rear lock arms 55 is dispersed in the load applied to the front and rear engagement positions, the bending load acts on the gear plate 60, and the load enduring performance drops.

To solve the problem of drop of the load, enduring performance due to "misaligned lock," it is effective to decrease (narrow) the pitch of the gear portions 65A, 65B of the gear plate 60, but the processing efficiency is low and the cost is high, or the structure is complicated if the lock arm 52 is provided with a mechanism for absorbing the misalignment. The invention is intended to decrease the misalignment substantially by deviating the phase of the engagement planes 65C of the front and rear gear portions 65A, 65B preliminarily by half pitch P each.

Once the engagement gear 55 and the gear portions 65A, 65B are locked, the lock shaft 51 is biased by the spring 75 to abut against the lower edge of the insertion hole 50, and thus rotation of the lock arm 52 about the lock shaft 51 in releasing direction is disabled by the meshing of the engagement gear 55 and gear portions 65A, 65B, and descending of the stepped shaft 43 is regulated because the lock arm 52 cannot be rotated in the releasing direction, so that the moving plate 46, the lock arm 52 and the gear plate 60 are mutually held in locked state.

The invention claimed is:

1. A vehicle seat configured to be adjustable in height having a height adjusting mechanism composed of a link mechanism disposed between a lower rail provided at a vehicle body side and the vehicle seat, said vehicle seat comprising:
   a guide plate provided on the vehicle seat;
   a gear plate attached to the lower rail and movably provided on the guide plate in a straight direction;
   a pair of lock arms provided on the guide plate and engageable with a pair of gear portions of the gear plate when an emergency load is applied to a seat belt of a vehicle seat occupant;
   wherein an engagement plane of one gear portion deviates one half pitch from an engagement plane of another gear portion.

2. The vehicle seat according to claim 1,
   wherein each lock arm is rotatably supported by a lock shaft inserted, with a play, into an insertion hole provided in the guide plate.

3. The vehicle seat accord to claim 2, further comprising an engagement gear and a guide slot formed at a rotation end of each lock arm;
   a guide bar engaged with the guide slot and provided in a moving plate which is moved when the emergency load is applied to the seat belt; and
   wherein the guide slot and the guide bar are configured to engage the engagement gear with the gear portion when the moving plate is moved.

4. The vehicle seat according to claim 3,
   wherein the moving plate is attached to the guide plate by way of a stepped shaft fixed to the seat belt, the stepped shaft is elevatably provided in the insertion hole of the guide plate, and the stepped shaft is elevatably provided in a straight guide groove of the gear plate.

* * * * *